United States Patent
Ikeda (10) Patent No.: US 6,640,936 B2
(45) Date of Patent: Nov. 4, 2003

(54) BRAKE CABLE CONNECTING APPARATUS FOR DRUM BRAKE

(75) Inventor: Takashi Ikeda, Owariasahi (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 10/076,628

(22) Filed: Feb. 19, 2002

(65) Prior Publication Data

US 2002/0117367 A1 Aug. 29, 2002

(30) Foreign Application Priority Data

Feb. 23, 2001 (JP) ........................ 2001-047796

(51) Int. Cl.[7] ................... F16D 65/14; F16D 51/00
(52) U.S. Cl. .............. 188/2 D; 188/325; 188/106 F; 74/502.6
(58) Field of Search .................. 188/2 D, 325, 188/106 F, 106 A, 78, 331, 105; 74/500.5, 502.6

(56) References Cited

U.S. PATENT DOCUMENTS 6,435,317 B2 * 8/2002 Tanaka et al. ............... 188/2 D 2002/0185341 A1 * 12/2002 Ikeda et al.

FOREIGN PATENT DOCUMENTS

| EP | 1099874 | * | 5/2001 |
| EP | 1174627 | * | 1/2002 |
| JP | 132724 | * | 5/2001 |
| JP | 295874 | * | 10/2001 |

* cited by examiner

Primary Examiner—Douglas C. Butler
(74) Attorney, Agent, or Firm—Apex Juris, pllc; Tracy M. Heims (57) ABSTRACT

A brake cable connecting apparatus is structured to prevent the inadvertent disengagement of a cable end from the brake lever while transporting a drum brake. The bridge portion (11e) of the strut (11) extends above the free end (12e) of the brake lever (12) leaving a clearance (23), being smaller than the cable end (16a), therebetween. When the brake lever (12) rotates to the predetermined degree, the clearance (23) becomes larger than the cable end (16a) so that the cable end (16a) is able to pass through the clearance (23) between the bridge portion (11e) and the free end (12e).

3 Claims, 13 Drawing Sheets

BRAKE CABLE CONNECTING APPARATUS FOR DRUM BRAKE

BACKGROUND OF THE INVENTION

1. Field of the Invention

This invention relates to a brake-actuating mechanism for use on a drum brake device, designed to mechanically move a pair of brake shoes away from each other in response to operation of a brake lever. More particularly, it relates to a brake cable connecting apparatus designed to prevent the inadvertent disconnection of a brake cable from the brake lever, even during the transportation of the drum brake device with the brake cable already connected to the brake lever of the brake-actuating mechanism.

2. Description of Related Art

Previously, one known type of a prior art brake cable connecting apparatus in a brake-actuating mechanism as described above is illustrated in FIG. 15, disclosed in the U.S. Pat. No. 5,311,793.

Figure 15:
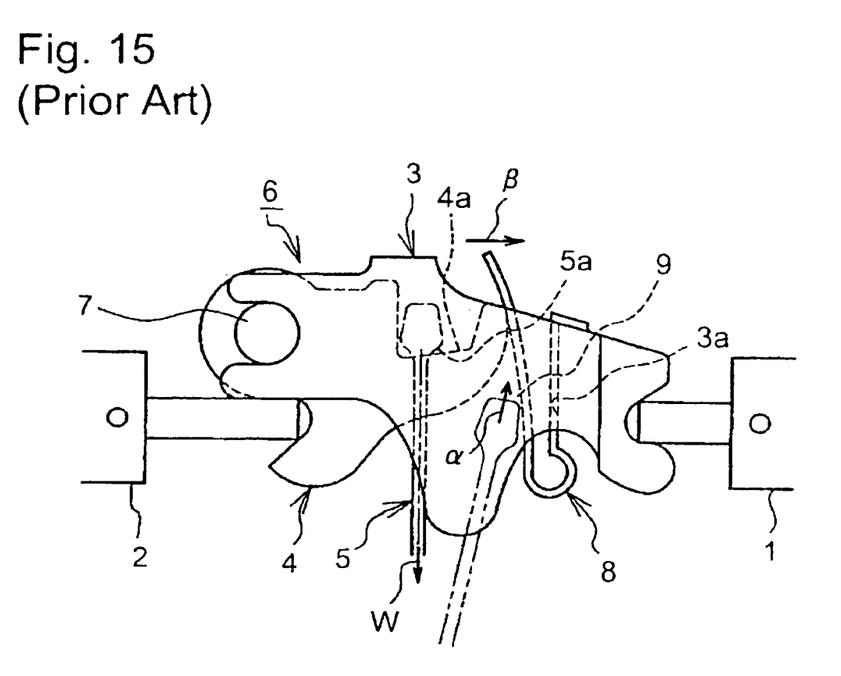
FIG. 15 is a front view of a conventional brake cable connecting apparatus of a brake-actuating mechanism.

In FIG. 15, a pair of brake shoes is identified by reference numerals 1 and 2, respectively. A strut, a brake lever and a brake cable are identified by reference numerals 3, 4 and 5, respectively. The strut 3 and the brake lever 4 comprise an actuating mechanism 6.

One brake shoe 1 is functionally engaged with one end of the strut 3. The brake lever 4 is pivotally supported on the strut 3 in a state in which a proximal end of the brake lever 4 is pivoted about the other end of the strut 3 by means of a pivot pin 7. The other brake shoe 2 is functionally engaged with the proximal end of the brake lever 4. Notched grooves 4a are formed on a free end of the brake lever 4, with which a cable end 5a of the brake cable 5 is engaged in a cable operating direction.

If a cable operating force as shown in "W" is applied to the brake lever 4 via the brake cable 5, the brake lever 4 rotates around the pivot pin 7 in a correspond direction so as to push the brake shoe 2.

On the other hand, a rotation of the brake lever 4 around the pivot pin 7 as described above furnishes the strut 3 with a counteracting force via the pivot pin 7 so as to push the strut 3 leftward FIG. 15 together with the brake shoe 1.

Due to the movement of both brake shoes away from each other, the brake shoes 1, 2 are pushed against an inner circumferential surface of a brake drum not shown in FIG. 15, thereby providing a predetermined braking action.

However, the drum brake device is often transported in a condition that the cable end 5a is engaged with the brake lever 4. In such a case, the brake cable 5 can easily be disconnected from the brake-actuating mechanism 6, causing a notable decrease in work efficiency for connecting the brake cable and increasing a chance of misassembling of the brake cable.

The following structure is added to the brake-actuating mechanism 6 in order to prevent the inadvertent disconnection of the brake cable 5.

A distance between a free end surface of the brake lever 4 and an inner end wall 3a of the strut 3 is sized to reserve a sufficient clearance for the cable end 5a to pass through, into which a V-shaped plate spring 8 is inserted so as to normally plug the clearance. However, a tapered space 9 is formed between the V-shaped plate spring 8 and the free end surface of the brake lever 4 so as to guide an insertion of the cable end 5a.

For connecting the brake cable 5 to the brake lever 4, the cable end 5a is temporary inserted in the tapered space 9 from the outside of the drum brake device as shown in a two-dot chain line in FIG. 15, and then the brake cable 5 with the cable end 5a is pushed into the tapered space 9 in the direction of an arrow α.

During this process, the cable end 5a approaches against the tapered space 9 with resilient deformation, in the direction of an arrow β, of the V-shaped plate spring 8. When the cable end 5a moves beyond the free end surface of the brake lever 4, the cable end 5a is snapped in and engaged with the notched grooves 4a of the brake lever 4 because of a resilient force, in an opposite direction of the arrow β, of the V-shaped plate spring 8. Then, the V-shaped plate spring 8 returns to the initial position by the resilient force; therefore the clearance for the cable end 5a to pass through is plugged, thereby eliminating a chance of the disengagement of the cable end 5a from the brake lever 4.

Figure 16A:
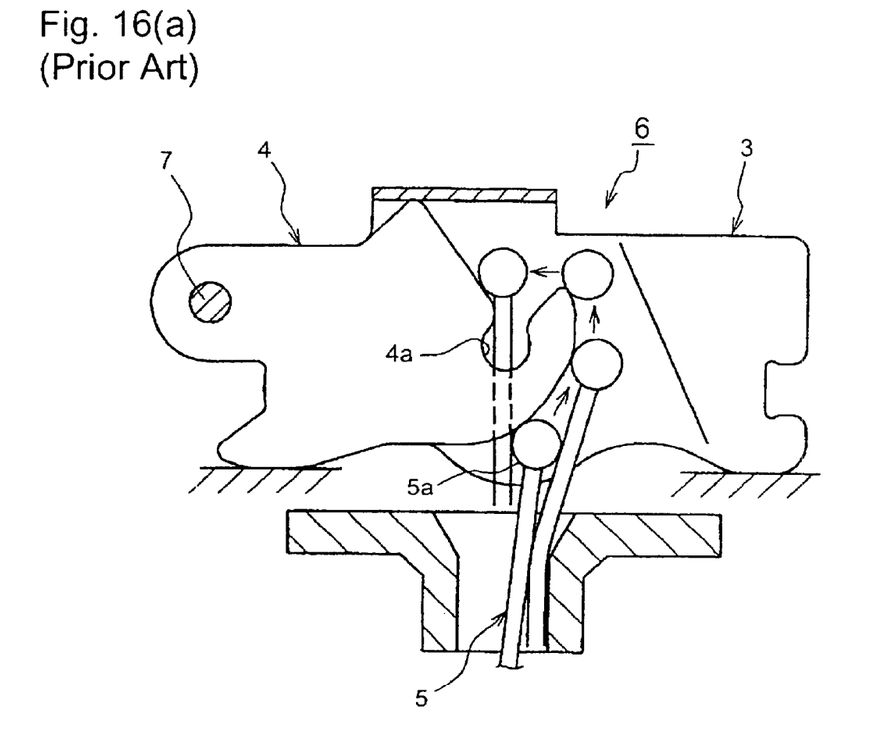
FIG. 16(a) is a longitudinal sectional view illustrating a process of inserting a conventional brake cable to a connecting apparatus of a brake-actuating mechanism according to another type of components.
Figure 16B:
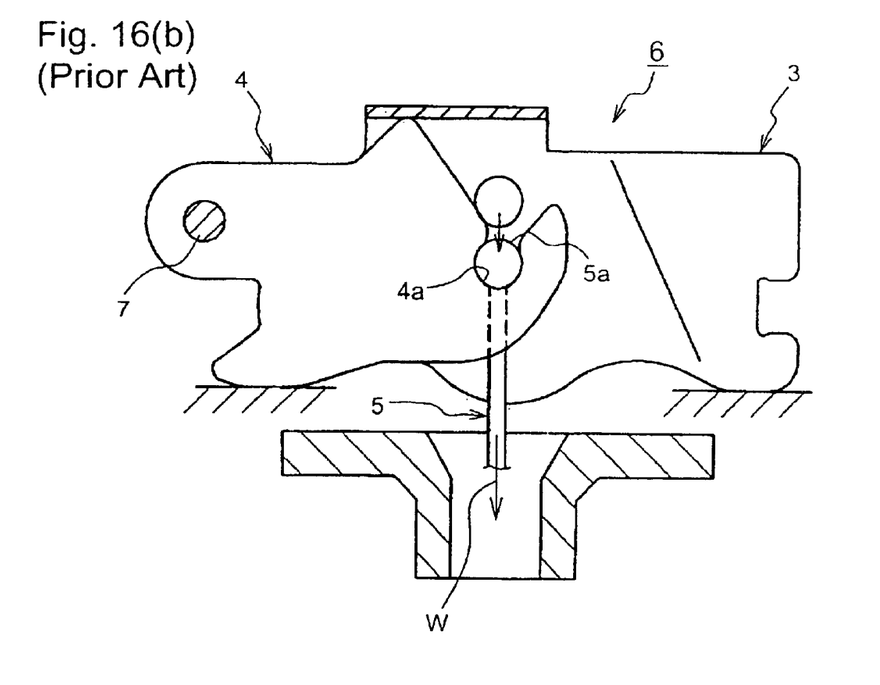
FIG. 16(b) is a longitudinal sectional view illustrating a process of operating the conventional brake cable in the cable operating direction after inserting the brake cable to the brake-actuating mechanism.

Previously, another type of a conventional brake cable connecting apparatus in a brake-actuating mechanism is illustrated in FIGS. 16(a) and 16(b), disclosed in the Japanese Provisional Patent Publication Number 2000-103855. Same reference numerals in FIG. 15 are used for members and portions with same functions in FIGS. 16(a) and 16(b).

When the cable end 5a of the brake cable 5 engages with the notched grooves 4a on the free end of the brake lever 4, the cable end 5a is temporary positioned above the notched grooves 4a according to a process as shown in FIG. 16(a). Then, the brake cable 5 is operated as shown in arrows in FIG. 16(b) to snap the cable end 5a in the notched grooves 4a.

If a drum brake device is transported in the condition that the cable end 5a is being engaged with the brake lever 4, in order to prevent the inadvertent disconnection of the brake cable 5 from the brake-actuation mechanism 6, the size of mouths on the notched grooves 4a is designed to be smaller than a diameter of the cable end 5a so as to snap in the notched grooves 4a with applying a large cable operating force "W" to the brake cable 5 at a final process as shown in the arrows in FIG. 16(b), thereby preventing the inadvertent disconnection of the brake cable 5.

However, between the above-described conventional ways of preventing the inadvertent disengagement of the cable end from the brake lever, the former way described in FIG. 15 requires the high-costly V-shaped plate spring 8 as an additional member which relatively increases the cost of the brake-actuating mechanism 6 while the latter way described in FIGS. 16(a) and 16(b) requires a larger cable operating force in a process of snapping the cable end in the notched grooves 4a, which not only decreases work efficiency for snapping the cable end in but also creates a chance of damaging and deforming the cable end 5a and/or the mouths of the notched grooves 4a during the process.

SUMMARY OF THE INVENTION

An object of a first invention is to provide a brake cable connecting apparatus which realizes a way to prevent the inadvertent disengagement of a cable end of a brake cable from a brake lever of a brake-actuating mechanism based on a different concept as used in the conventional ways or methods. This invention, which fundamentally using existing members without an additional member, accurately prevents the inadvertent disengagement of the cable end from notched grooves of a free end of the brake lever. Further, this invention eliminates necessary large cable operation force at the time of snapping the cable end in the notched groove. Accordingly, there is no need to sacrifice the work efficiency for connecting the brake cable and create a chance of damaging or deforming the cable end and/or the mouths of the notched grooves, thereby surely preventing the inadvertent disengagement of the cable end from the notched grooves.

An object of a second invention is to provide a brake cable connecting apparatus which achieves the same level of effectiveness as in the first invention by way of using a shoe return spring of a drum brake device.

An object of a third invention is to provide a brake cable connecting apparatus which achieves the same level of effectiveness as in the first invention by way of using a lever return spring comprising a brake-actuating mechanism.

This invention is a brake cable connecting apparatus of a brake-actuating mechanism for a drum brake. The brake-actuating mechanism comprising: a strut engaging with one of a pair of brake shoes at one end thereof; and a brake lever, being pivotally attached to the other end of the strut, engaging with the other of the brake shoes at the other end thereof. A cable end of a brake cable engages with a cable end engaging portion of the brake lever in a cable operating direction. A cable end stopper, preventing an inadvertent disengagement of the cable end from the brake lever in cooperation with the free end of the brake lever, is provided on the strut. When the cable end is operated to move toward the cable end engaging portion in the cable operating direction in a clearance between the stopper and the free end of the brake lever so as to engage the cable end with the cable end engaging portion of the brake lever, the cable end can pass through a clearance between the stopper and the free end of the brake lever because of a rotation of the brake lever against the returning force of the brake lever.

This invention still is a brake cable connecting apparatus as above, wherein the returning force of the brake lever is generated by a shoe return spring.

This invention yet is a brake cable connecting apparatus as above, wherein the returning force of the brake lever is generated by lever return spring.

If a cable operating force of a brake cable is transmitted to the brake lever via a cable end, the brake lever and a strut around their pivoting section relatively rotates to move the brake shoes.

In the first invention, the cable end stopper provided on the struts prevent an inadvertent disengagement of the cable end from the brake lever in cooperation with the free end of the brake lever; therefore the brake cable does not disengage from the free end of the brake lever in the brake-actuating mechanism while transporting the drum brake device prior to its assembly on a vehicle, thereby eliminating a chance of decreasing the work efficiency for connecting the brake cable and a misassembly of the brake cable.

Accordingly, if the cable end of the brake cable is engaged with the brake lever, when the cable end is operated between the stopper and the free end of the brake lever, the cable end can pass through a clearance between the stopper and the free end of the brake lever because of a rotation of the brake lever against the returning force of the brake lever; therefore the cable end may be engaged with the free end of the brake lever.

Accordingly, generating the returning force of the brake lever by the existing members, there is no need for additional members to prevent the inadvertent disengagement of the cable end from a cable end engagement recesses on the free end of the brake lever securely.

The cable end engages with the free end of the brake lever with a force only rotating the brake lever against the returning force of the brake lever. Therefore, this invention realizes an effective way to engage the cable end with the brake lever without large cable operation force, thereby preventing a sacrifice of work efficiency for connecting the brake cable, and damages or deformations of the cable end and/or the brake lever.

Further, this invention makes it possible to confirm the snapping of the cable end by feeling the cable operating force while rotating the brake lever against the returning force of the brake lever and the impact noise of the cable end abutting against the cable end engagement recesses.

The second invention achieves the same level of effectiveness as in the first invention by way of providing the returning force of the brake lever by using a shoe return spring in a drum brake device.

The third invention achieves the same level of effectiveness as in the first invention by way of providing the returning force of the brake lever by using a lever return spring.

PREFERRED EMBODIMENT OF THE INVENTION

Embodiments of present invention will now be described in detail with reference to the drawings.

Figure 1:
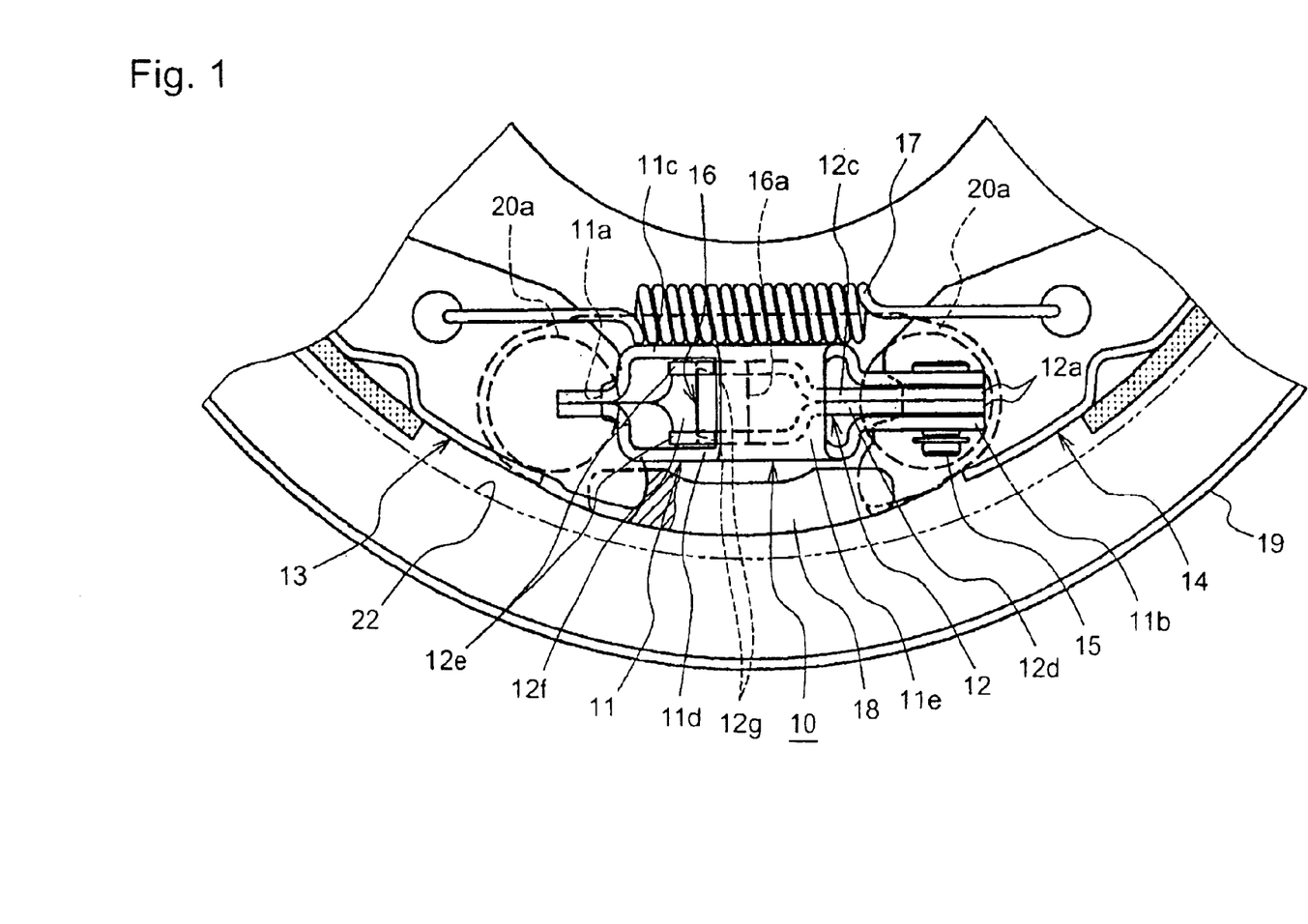
FIG. 1 is a plan view illustrating an essential part of a drum brake device including a brake cable connecting apparatus of a brake-actuating mechanism according to one example.
Figure 2:
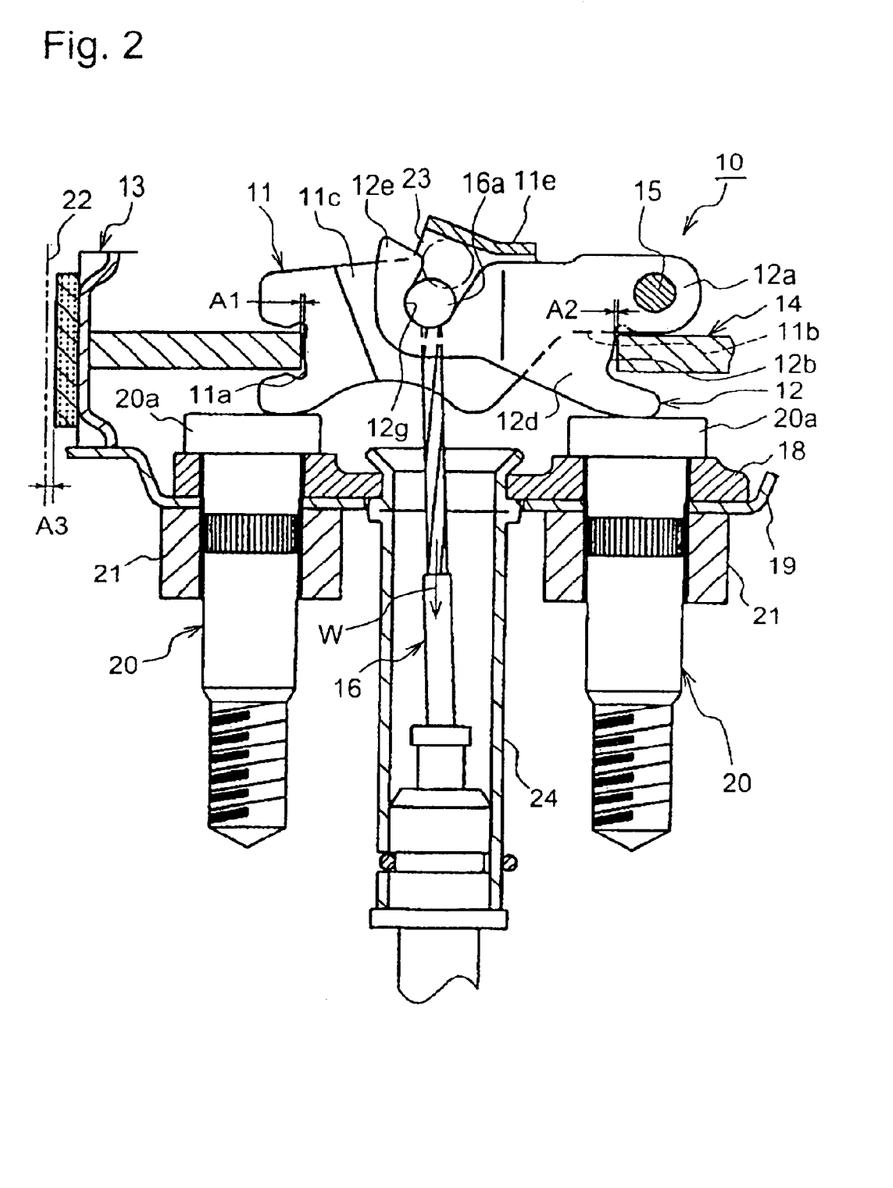
FIG. 2 is a longitudinal sectional view of FIG. 1.

A brake-actuating mechanism 10 with a brake cable connecting apparatus according to one example is illustrated in FIGS. 1 and 2. FIGS. 3–8 respectively show a process of connecting a brake cable 16 to the brake-actuating mechanism 10.

Components of the brake-actuating mechanism 10 are explained with FIGS. 1 and 2 which mainly includes a strut 11 and a brake lever 12.

The strut 11 is disposed between respective operating ends of brake shoes 13, 14. A brake shoe engagement groove 11a is formed at one end of the strut 11 so as to be engaged with one brake shoe 13.

A base end 12a of the brake lever 12 is pivotally attached to the other end 11b of the strut 11 by means of a pivot pin 15. A brake shoe engagement groove 12b of the brake lever 12 is formed adjacent to such a pivotal attachment portion so as to be engaged with the other brake shoe 14.

The strut 11 is formed as a rectangular frame body by bending a piece of plate. The rectangular frame body includes a pair of opposed sidewalls 11c, 11d closely superposed by means of spot welding at one end of the strut 11 where the groove 11a is formed, but spaced apart from each other at the other end 11b of the strut 11 so as to sandwich the proximal end 12a of the brake lever 12 between the sidewalls 11c, 11d. The sidewalls 11c, 11d are spaced apart from each other between both ends of the strut 11 by a distance therebetween greater than that at the other end 11b of the strut 11, but are connected together through a bridge portion 11e that spans between the sidewalls 11c, 11d.

The brake lever 12 includes a pair of opposed planar members 12c, 12d closely superposed by mean of spot welding at the base end 12a, but spaced apart from each other at free ends 12e of the brake lever 12 so as to form forked legs with a space 12f as shown in FIG. 1. The free ends 12e are interposed between the spaced-apart sidewall 11c, 11d.

Width of the space 12f at the free ends 12e, i.e., a distance between the planar members 12c, 12d at the free ends 12e, is defined by a shape of an cable end 16a of a brake cable 16, which cable end 16a is connected to the free ends 12e. A shape of the cable end 16a will now be described.

The cable end 16a forms a cylindrical shape having longitudinal dimension thereof greater than a diameter thereof, and assumes a rectangular shape as shown in FIG. 1 when viewed in a longitudinal direction of the brake cable 16.

The width of the space 12f is smaller than the longitudinal dimension of the cable end 16a, but is greater than the diameter of the cable end 16a. As shown in FIG. 1, such a construction allows the cable end 16a to be engaged with the free ends 12e in a cable operating direction.

Furthermore, the planar members 12c, 12d have respective cable end engagement recesses 12g formed at the free ends 12e so as to be engaged with the elongated cylindrical cable end 16a. Each of the cable end engagement recesses 12g has a bottom surface curved into an arcuate engagement surface in accordance with a circumferential curvature of the cable end 16a.

As shown in FIG. 1, a shoe return spring 17 is extended between the respective operating ends of the brake shoes 13, 14. An anchor block 18 is positioned in contact with the both brake shoes 13, 14 adjacent to the operating ends thereof. As shown in FIG. 2, the anchor block 18 is secured together with a back plate 19 to a non-rotatable vehicular portion such as a knuckle via a spacer 21 by means of a pair of bolts 20. The brake-actuating mechanism 10 is disposed on heads 20a of the bolts 20.

In the above construction, when a cable operating force indicated by arrow "W" in FIG. 2 is applied on the brake lever 12 via the brake cable 16, and then the brake lever 12 is rotated in a counterclockwise direction about the pivot pin 15, thereby thrusting the brake shoe 14 rightward.

At the same time, such pivotal movement of the brake lever 12 imparts a counteracting force to the strut 11 via the pivot pin 15, thereby pushing the strut 11 together with the brake shoe 13 leftward.

The brake shoes 13, 14 move away from each other so as to be pressed against an inner circumferential surface of a brake drum as shown in a two-dot chain line, thereby providing a predetermined braking action.

In this example, in order to prevent the inadvertent disengagement of the cable end 16a of the brake cable 16 from the cable end engagement recesses 12g while transporting the drum brake device, as shown in FIG. 2, the bridge portion 11e of the strut 11 is extended above the free end 12e, thereby functioning as a cable end stopper, preventing the inadvertent disengagement of the cable end 16a from the recesses 12g.

That is, the bridge portion (i.e., a cable end stopper) 11e of the strut 11 is extending above the free end 12e of the brake lever 12 leaving a slight clearance 23 smaller than a diameter of the cable end 16a between the bridge portion 11e and the free end 12e. Accordingly, even if the cable end 16a is about to disengage from the cable end engagement recesses 12g as shown in the two-dot chain line of FIG. 2, a further movement of the cable end 16a is prevented by cooperation between the bridge portion 11e of the strut 11 and the free end 12e of the brake lever 12.

Therefore, the device in this example prevents the inadvertent disconnection of the brake cable 16, while transporting the drum brake device prior to assembly on the vehicle, from the free end 12e of the brake lever 12 of the brake-actuating mechanism 10, thereby also preventing a decreasing of work efficiency for connecting the brake cable 16.

In this example, the clearance 23 reserved between the bridge portion 11e of the strut 11 and the free end 12e of the brake lever 12 is designed to allow the functional engagement of the cable end 16a in addition to being smaller than the diameter of the cable end 16a as described above.

Accordingly, initial or returning positions of the brake shoes 13, 14 being urged by a shoe return spring 17 in FIG. 1 are restricted by an anchor block 18, and clearances A1, A2 exist between the brake shoes 13, 14 and the brake shoe engagement grooves 11a, 12b as shown in FIG. 2. If the amount of rotation of the brake lever 12 is sufficient to fill the clearances A1, A2, the clearance 23 is smaller than the diameter of the cable end 16a, thereby assuring the prevention of the inadvertent disengagement of the cable end from the free end 12e of the brake lever 12. Further rotation of the brake lever 12 spreads the brake shoes 13, 14 open to fill the shoe clearances between both brake shoes 13, 14 and the inner circumferential surface 22. The clearance 23 is set to exceed the diameter of the cable end 16*a* during this operation.

Figure 3:
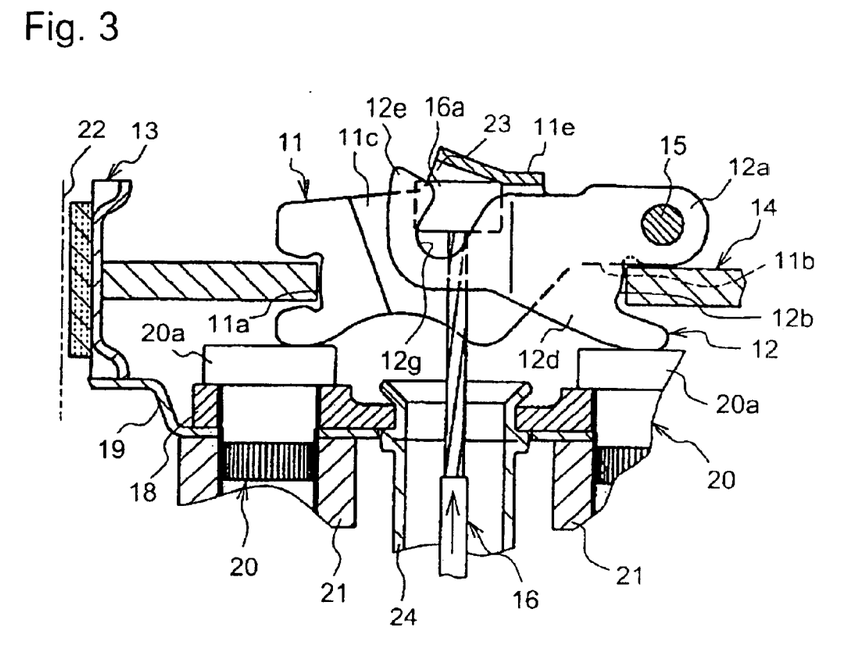
FIG. 3 is the longitudinal sectional view of FIG. 2 illustrating a first step in a progress of connecting a brake cable to the brake-actuating mechanism.

In the above structured brake-actuating mechanism 10, if the cable end 16*a* is inserted through a guide pipe 24 shown in FIG. 2 and is engaged with the cable end engagement recesses 12*g* of the brake lever 12, as shown in FIG. 3, the cable end 16*a* is directed longitudinally parallel to the plate members 12*c*, 12*d* (see FIG. 3 showing the plate member 12*d*) of the brake lever 12, and the cable end 16*a* proceeds in a cable releasing direction into the space 12*f* referring to FIG. 1 between the plate members 12*c*, 12*d*.

Figure 4:
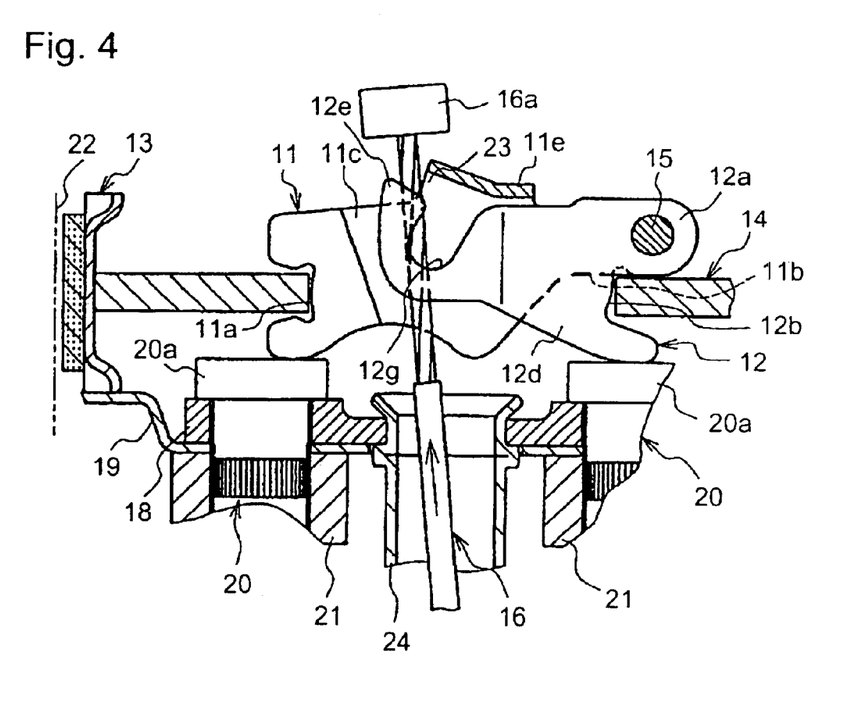
FIG. 4 is the longitudinal sectional view of FIG. 3 illustrating a second step in the progress of connecting the brake cable.

FIG. 3 shows a condition when the cable end 16*a* is inserted into the space 12*f* between the plate members 12*c*, 12*d* and is contacted with the bridge portion 11*e*, while FIG. 4 shows a condition when the brake cable 16 projects from the brake-actuating mechanism 10 above the clearance 23 because of further inserting the cable end 16*a* along the slant of the bridge portion 11*e*.

Figure 5:
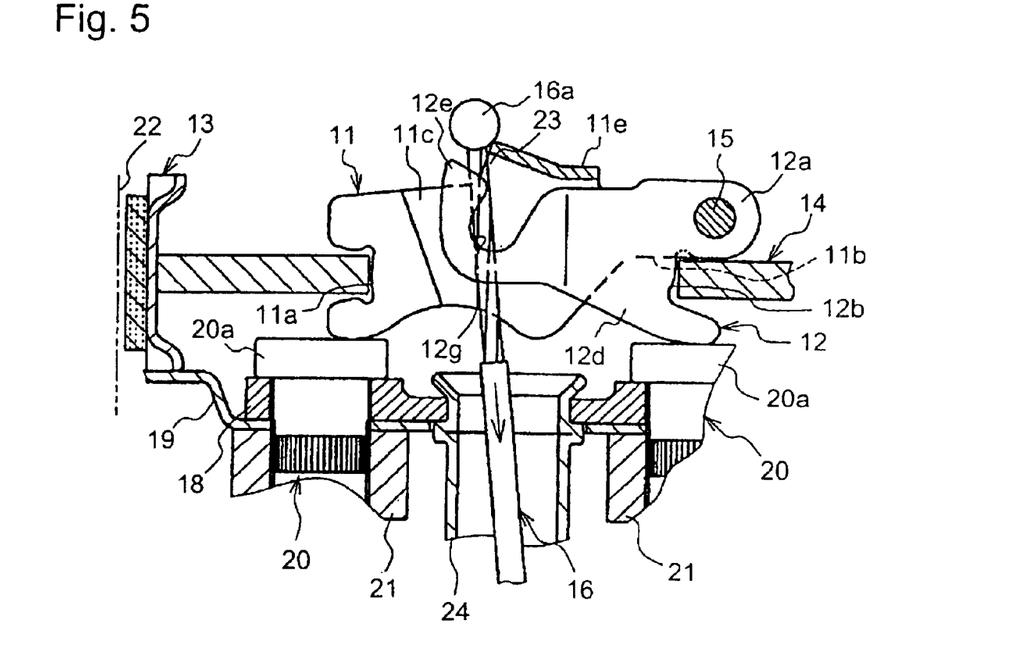
FIG. 5 is the longitudinal sectional view of FIG. 2 illustrating a third step in the progress of connecting the brake cable.

Under this condition, the brake cable 16 is pivoted and rotated for 90 degree so that the cable end 16*a* is orthogonal to the plate members 12*c*, 12*d* and the cable end 16*a* is operated while the longitudinal direction of the brake cable 16 as shown in FIG. 5.

The cable end 16*a* reaches to the clearance 23 between the free end 12*e* of the brake lever 12 and the bridge portion, and the brake lever 12 is moved to a position shown in a solid line from an initial position shown in a two-dot chain line (corresponding to the brake lever as shown in a solid line in FIGS. 1–5) for the space as A1, A2 in FIG. 2.

Figure 6:
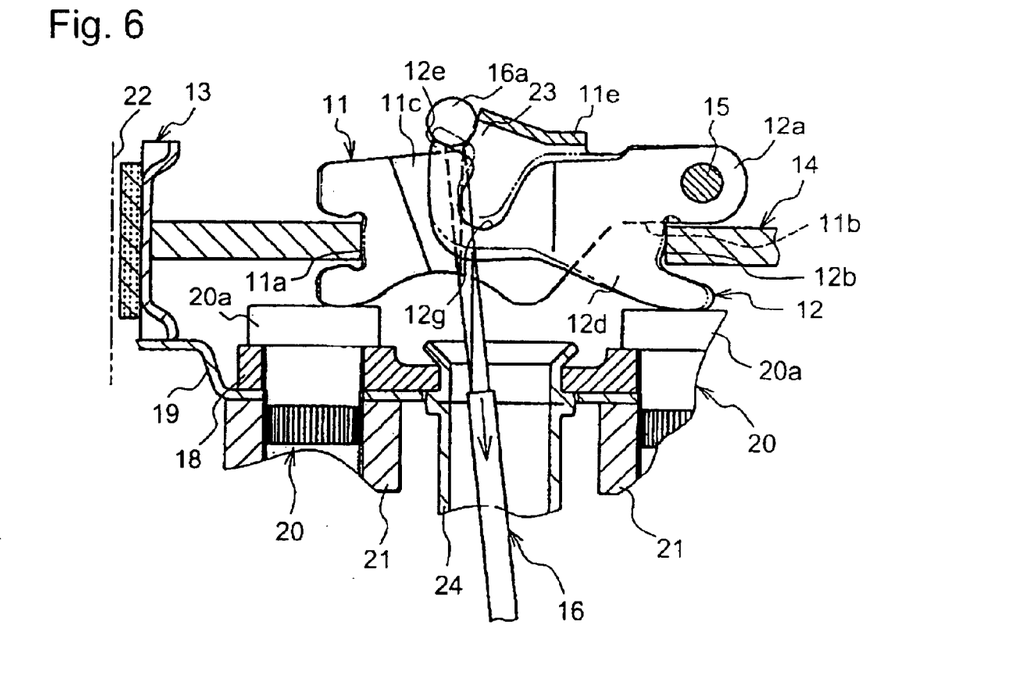
FIG. 6 is the longitudinal sectional view of FIG. 2 illustrating a fourth step in the progress of connecting the brake cable.
Figure 7:
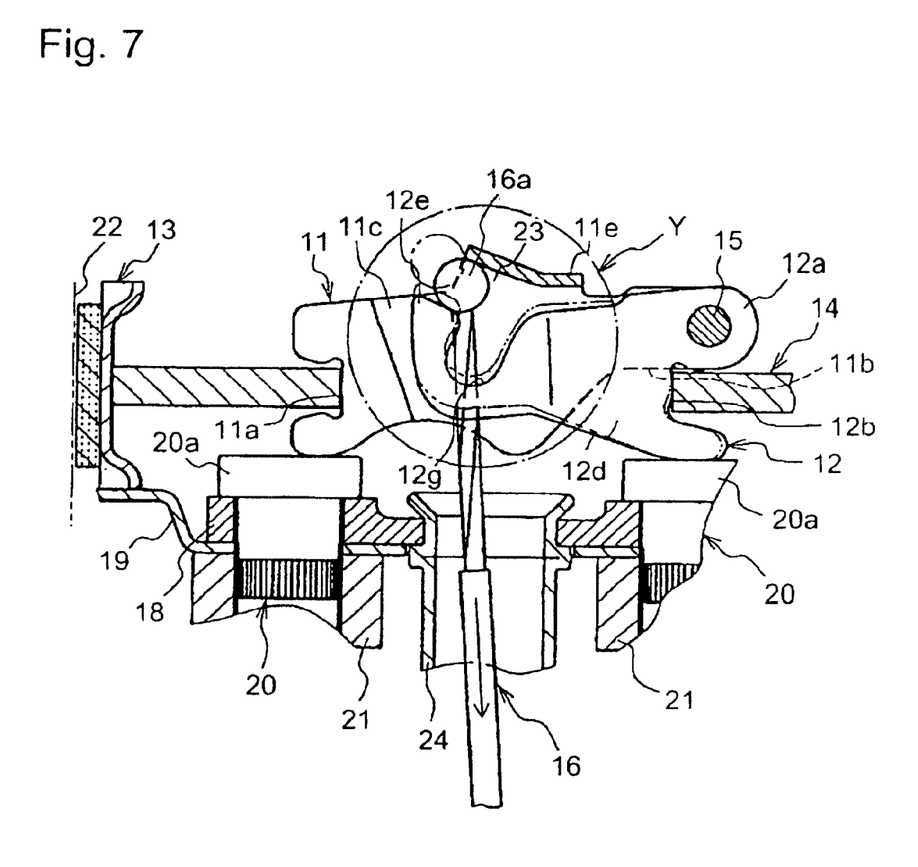
FIG. 7 is the longitudinal sectional view of FIG. 2 illustrating a fifth step in the progress of connecting the brake cable.
Figure 8:
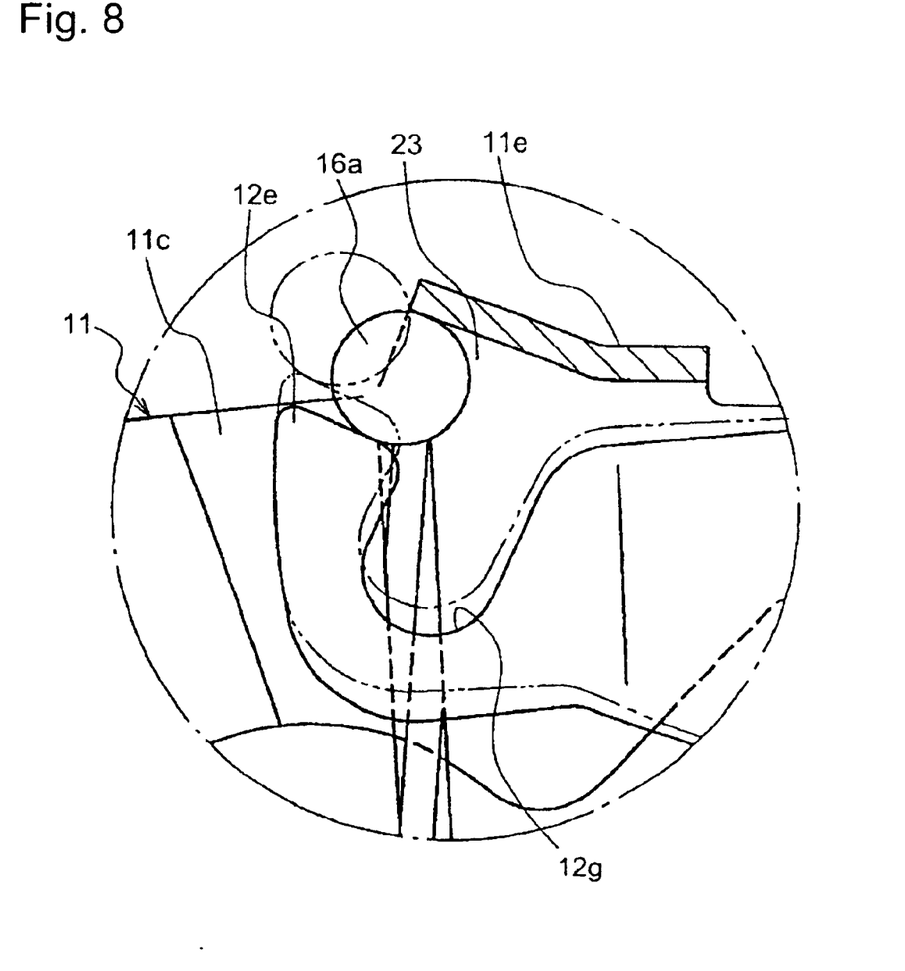
FIG. 8 shows the elements of the enlarged section VIII of FIG. 7.

If the brake cable 16 is further operated in the cable operating direction, the cable end 16*a* moves to the solid line from the two-dot chain line in FIGS. 7 and 8 (corresponding to the cable end as shown in a solid line in FIG. 6) with further rotation of the brake lever 12.

Because a resilient force of the shoe return spring 17 referring to FIG. 1 acts on the strut 11 and the brake lever 12 in a returning direction of the brake lever 12 via the brake shoes 13, 14, such rotation of the brake lever 12 is performed against the returning force of the brake lever 12 due to the shoe return spring 17. At this time, during the movement of the brake shoes 13, 14 to spread apart from each other as shown in FIG. 2 to fill the shoe clearance A3, the clearance 23 between the free end 12*e* of the brake lever 12 and the bridge portion 11*e* becomes sufficient size for passing the cable end 16*a* through.

Therefore, the cable end 16*a* is snapped in the cable end engagement recesses 12*g* finally as shown in FIGS. 1 and 2, and at this time, the brake lever 12 rotates back at least to the position of the solid line in FIG. 6 or the positions in FIGS. 1–5 because of the resilient force of the shoe return spring 17, thereby narrowing the clearance 23 back to the condition smaller than the diameter of the cable end 16*a*.

Accordingly, after completing the connection of the brake cable 16 to the brake lever 12, even if the cable end 16*a* moves in the cable releasing direction as shown in the two-dot chain line of FIG. 2 creating a chance of inadvertent disengaging from the cable end engagement recesses 12*g*, the cable end 16*a* cannot pass through the reduced clearance 23 as described above, thereby preventing the inadvertent disengagement of the cable end 16*a* from the cable end engagement recesses 12*g*.

Also in this example, the structure for engaging the cable end 16*a* with the cable end engagement recesses 12*g* is as described above, more specifically, and when the cable end 16*a* is operated in the cable operating direction in the clearance 23, the brake lever 12 rotates against the returning force of the brake lever 12 makes the clearance 23 sufficient for the cable end 16*a* to pass through. Accordingly, because the cable end 16*a* may be positioned on the cable end engagement recesses 12*g*, by applying the resilient force of the shoe return spring 17 as an existing member to the brake lever 12, basically the cable end 16*a* is prevented the inadvertent disengagement from the recesses 12*g* without using an additional member. Therefore, no additional member is necessary which reduces the manufacturing cost. Further, the cable end 16*a* is positioned on the free end 12*e* of the brake lever 12 by a force just enough to rotate the brake lever 12 against the above returning force of the brake lever 12. Further, the prevention of the inadvertent disengagement of the cable end 16*a* is realized without damaging or deforming the cable end 16*a* and/or the brake lever 12. In addition, this invention makes it possible to secure sure the snapping of the cable end in the cable end engagement recesses 12*g* by feeling the cable operating force while rotating the brake lever 12 against returning force of the brake lever 12 and by feeling the impact noise of the cable end 16*a* abutting against the surface of the recesses 12*g* of the brake lever 12.

Figure 9:
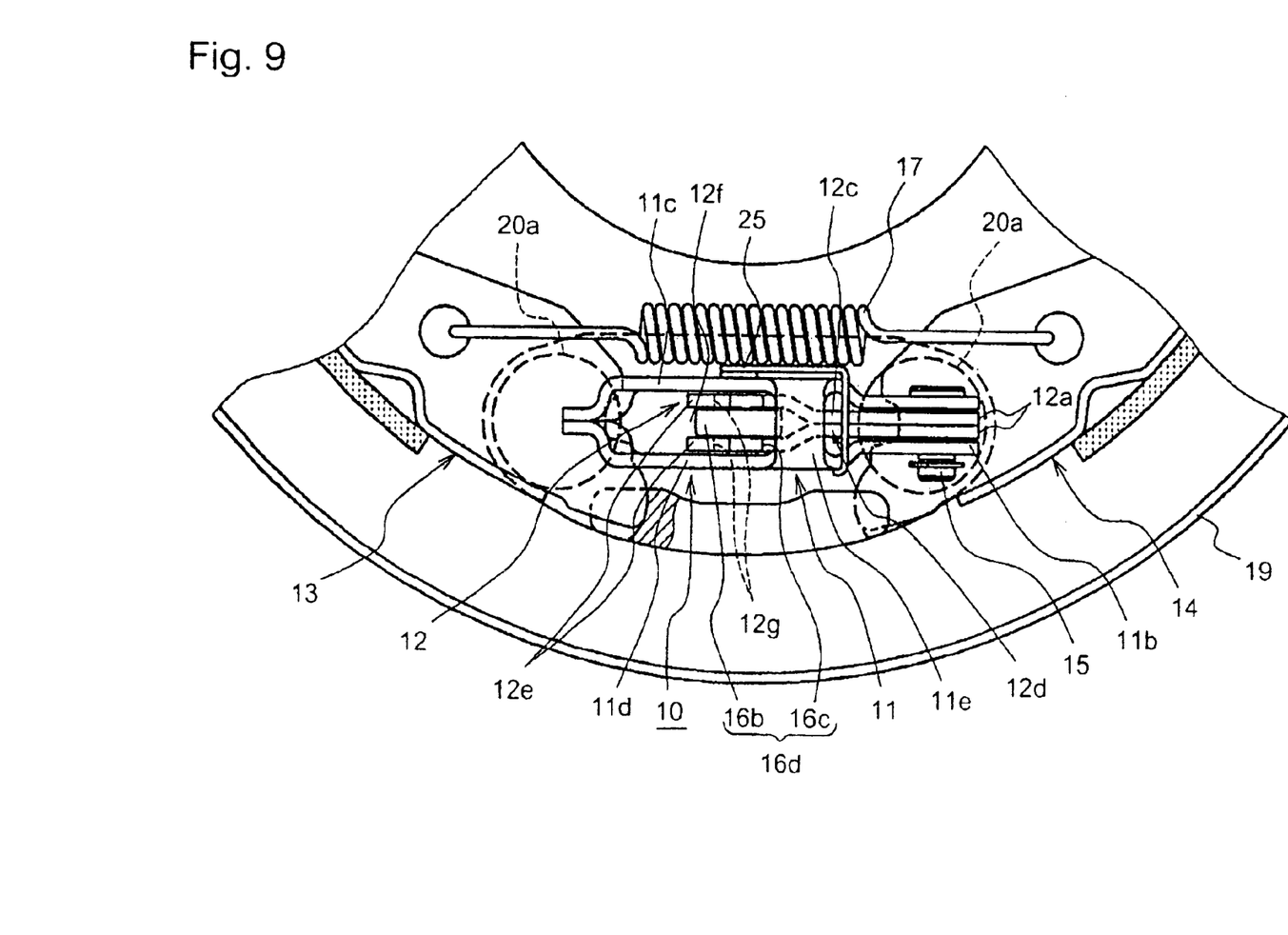
FIG. 9 is a plan view illustrating an essential part of a drum brake device including a brake cable connecting apparatus of a brake-actuating mechanism according to another example.
Figure 10:
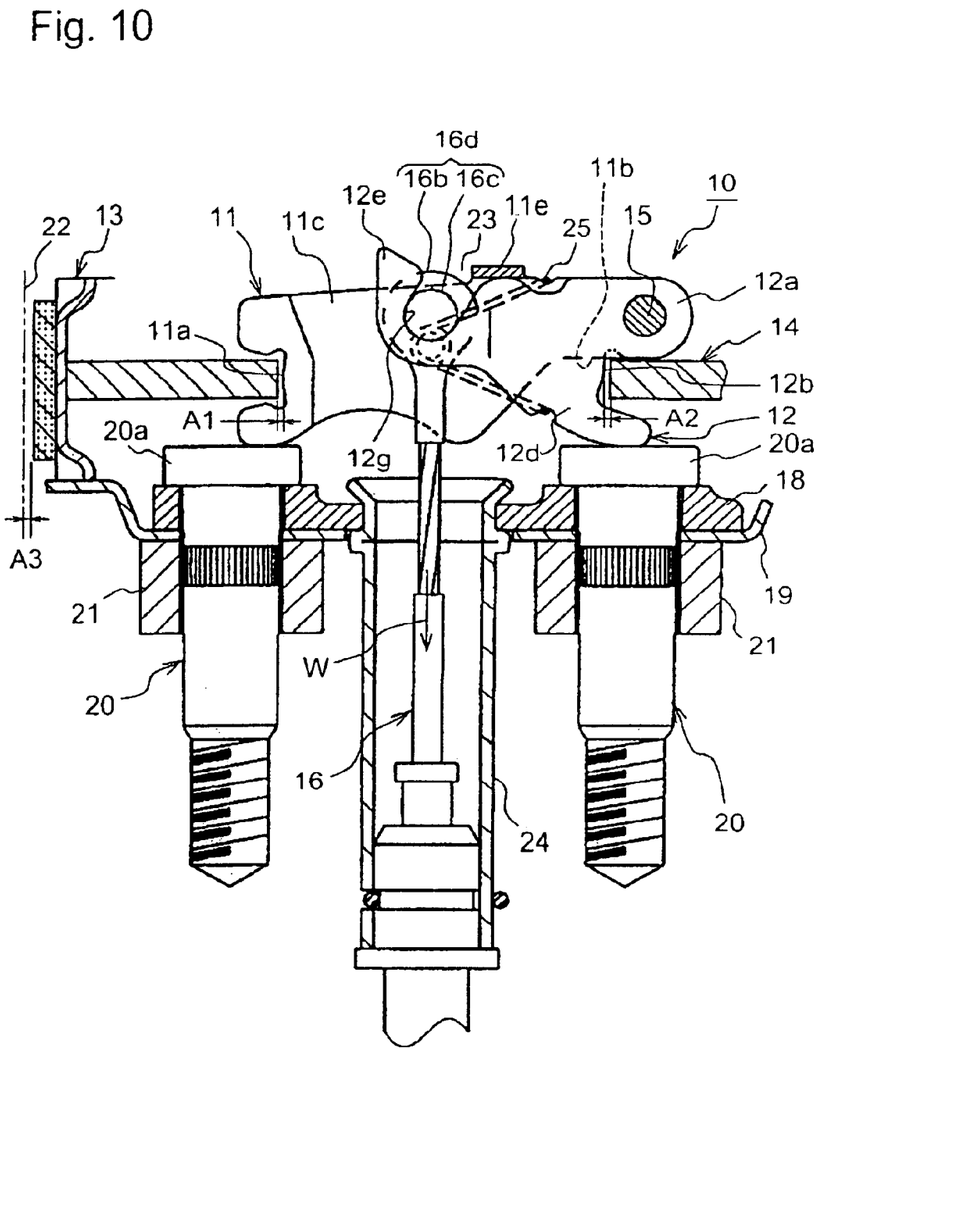
FIG. 10 is a longitudinal sectional view of FIG. 9.

A brake-actuating mechanism 10 with a brake cable connecting apparatus according to another example is illustrated in FIGS. 9 and 10. A cable end 16*d* of the brake cable 16 is formed as a trunnion shaped cable end instead of the cylindrical cable end 16*a* as shown in FIGS. 1–8. This trunnion shaped cable end 16*d* consists of a disc-like portion 16*b* and two trunnions 16*c*, each projecting from each facing surface of the disc-like portion 16*b*. The trunnion 16*c* of the cable end 16*d* are engaged with the cable end engagement recesses 12*g* on the free end of the brake lever 12.

This example comprises a torsion coil spring type lever return spring 25 urging the brake lever 12 clockwise in FIG. 10, and a rotationally returning position of the brake lever 12 is restricted by the bridge portion 11*e* of the strut 11 as shown in FIG. 10. In this returning position, the clearance 23 between the free end 12*e* of the brake lever 12 and the bridge portion 11*e* is designed to be such that the cable end 16*d* is not disengaged from the cable end engagement recesses 12*g* on the free end, and the bridge portion 11*e* functions as a cable end stopper just like the above-described one example.

The clearance 23 is designed to be a size sufficient to pass the cable end 16*d* to pass through when the brake lever 12 rotates while filling the clearances shown in A1, A2 in FIG. 10 that existed between the brake shoes 13, 14 and the brake shoe engagement grooves 11*a* and 12*b*.

Figure 11:
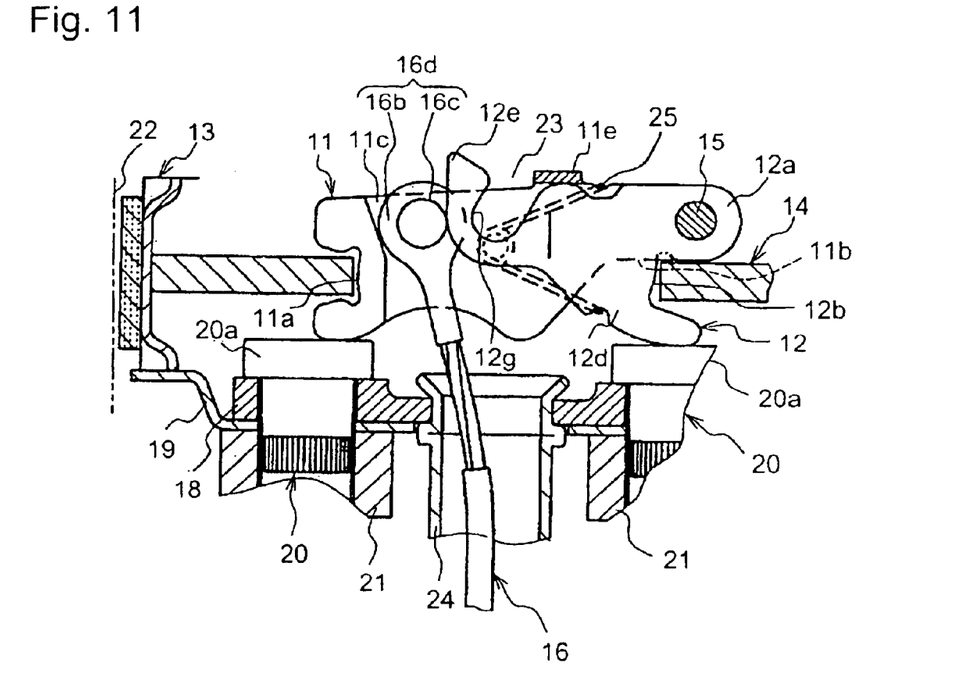
FIG. 11 is the longitudinal sectional view of FIG. 10 illustrating a first step in a progress of connecting the brake cable to the brake-actuating mechanism.

In the above structure, as shown in FIG. 10, when the cable end 16*d* is inserted through the guide pipe 24 to be engaged with the cable end engagement recesses 12*g*, the cable end 16*d* as shown in FIG. 11 is inserted and moved into a space between a top 12*e* of the brake lever 12 and an inner end surface of the strut 11 facing the top 12*e*. At this time, a certain part of the disc-like portion 16*b* of the cable end 16*d* is passing a space between the plate members 12*c* and 12*d* (FIG. 11 shows the plate member 12*d*).

Figure 12:
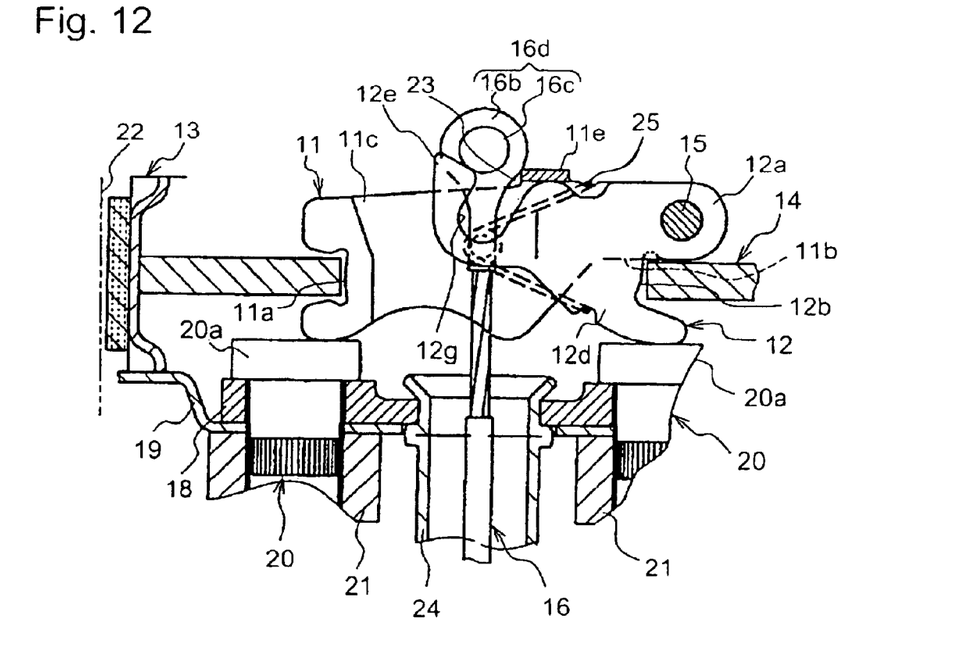
FIG. 12 is the longitudinal sectional view of FIG. 10 illustrating a second step in the progress of connecting the brake cable to the brake-actuating mechanism.

Then, the cable end 16*d* passing and reaching the clearance 23 as shown in FIG. 12 is operated in the cable operating direction, and the brake lever 12 rotates counterclockwise from an initial position in the figure against the resilient force of the return spring 25 for the clearances A1, A2 shown in FIG. 10.

At this time, the clearance 23 becomes the size allowing the cable end 16*d* to pass through, and the cable end 16*d* is finally engaged with the cable end engagement recesses 12g as shown in FIGS. 9 and 10.

The clearance 23 allowing passage of the cable end 16d is not limited to what is described herein, and it is obvious that a shoe clearance A3 as shown in FIG. 10 made be added.

The brake lever 12 at the engagement rotates back to the initial position abutting against the bridge portion 11e because of the resilient force of the lever return spring 25, and the clearance 23 is small for the cable end 16d to pass through. As such, after completing the connection of the brake cable 16 to the brake lever 12, if the cable end 16d is moved from the cable end engagement recesses 12g to be disengaged through the clearance 23 from the recesses 12g, the cable end 16d cannot pass through the already smaller clearance 23, and the cable end 16d is prevented from the inadvertent disengagement from the cable end engagement recesses 12g while the drum brake device is being transported.

Also in this example, the structure of engaging the cable end 16d with the cable end engagement recesses 12g is made the structure as described above, more specifically, and when the cable end 16a is operated in the cable operating direction in the clearance 23, the brake lever 12 rotates against the returning force of the brake lever 12 due to lever return spring 25. Accordingly, because the cable end 16d may be positioned on the cable end engagement recesses 12g, by applying the resilient force of the lever return spring 25 as an existing member to the brake lever 12, the cable end 16d is prevented the inadvertent disengagement from the recesses 12g without using an additional member. Further, the cable end 16d is positioned on the free end 12e of the brake lever 12 with a force just enough to rotate the brake lever 12 against the returning force. Therefore, no large cable operation force is necessary which may sacrifice the work efficiency for connecting the brake cable. Further, the prevention of the inadvertent disengagement of the cable end 16d is realized without damaging or deforming the cable end 16d and/or the brake lever 12.

In this example, especially just after the cable end 16d passes through the clearance 23, the brake lever 12 rotates back to the initial position because of a enhanced resilient force of the lever return spring 25, and the cable end engagement recesses 12g abuts against and collides with the trunnion 16c generating a hammering sound indicating a sure brake cable connection.

Figure 13:
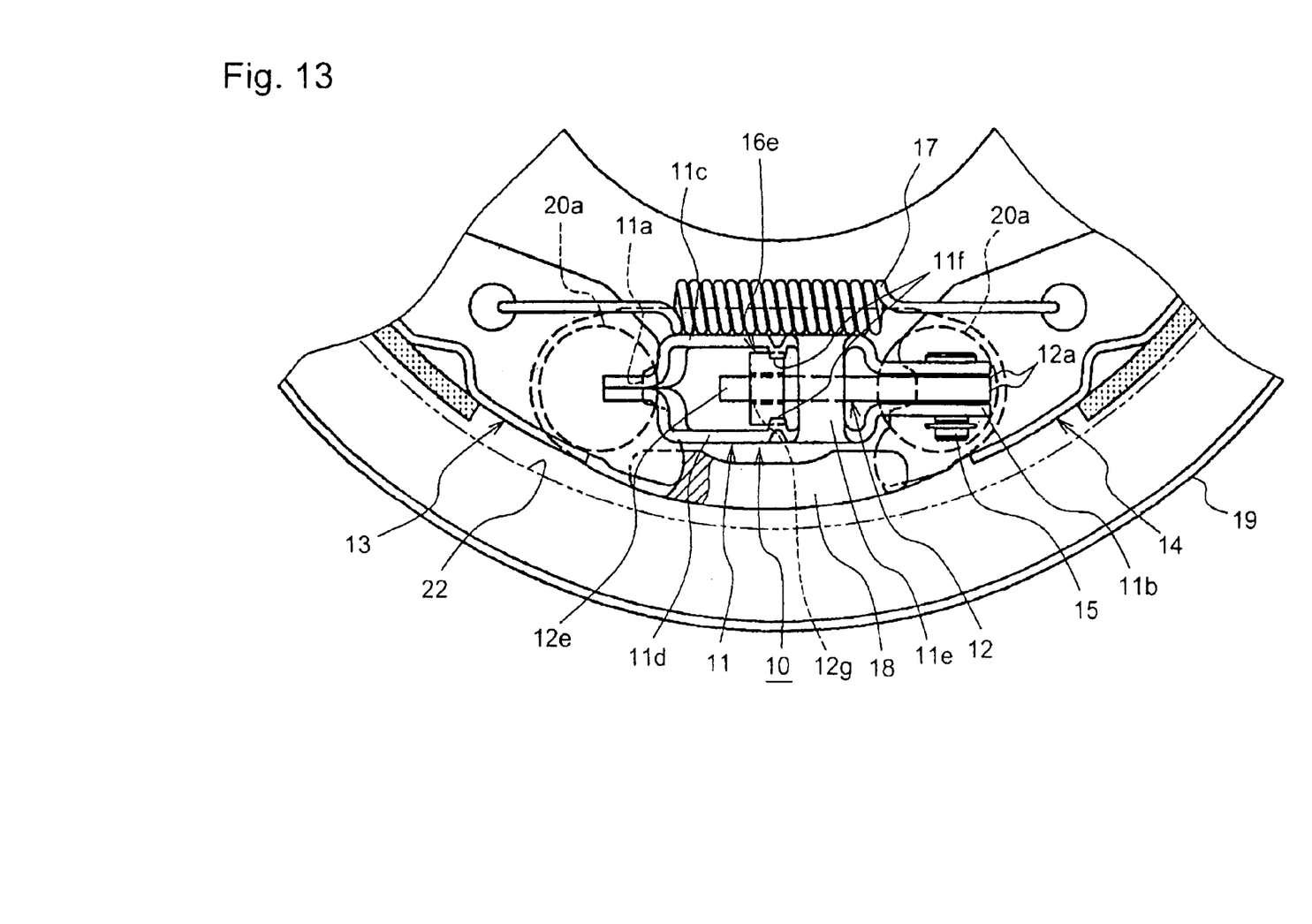
FIG. 13 is a plan view illustrating an essential part of a drum brake device including a brake cable connecting apparatus of a brake-actuating mechanism according to still another example.
Figure 14A:
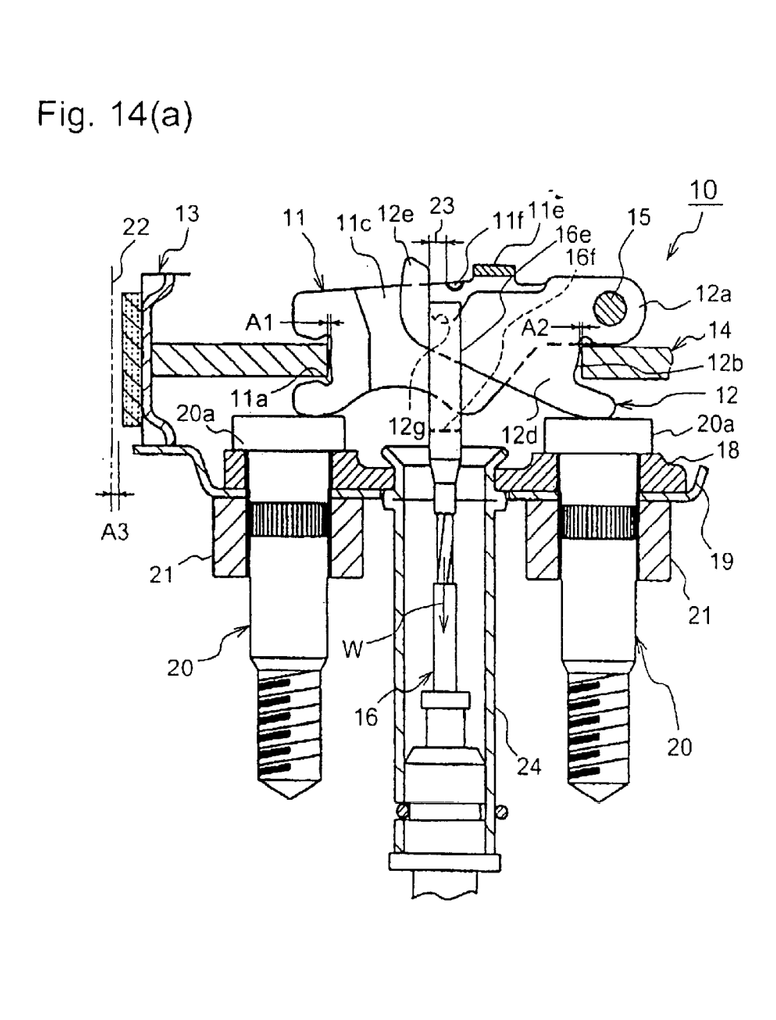
FIG. 14(a) is a longitudinal sectional view illustrating a drum brake device including a brake cable connecting apparatus of a brake-actuating mechanism.
Figure 14B:
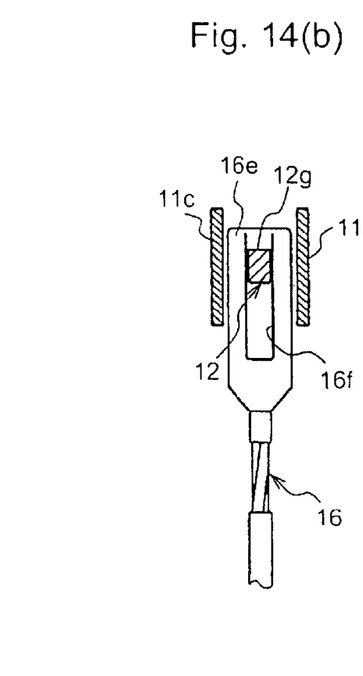
FIG. 14(b) is a sectional view of an engagement section between the brake lever and the cable end.

A brake-actuating mechanism 10 with a brake cable connecting apparatus according to still another example is illustrated in FIGS. 13 and 14. A brake lever 12 is made of mono-plate member. The cable end 16e of the brake cable 16 has a rectangular hole 16f as shown in FIG. 14(b), through which a free end 12e of the brake lever 12 penetrates so as to engage the cable end 16e with the cable end engagement recess 12g on the free end 12e of the brake lever 12.

Projections (stoppers) 11f are formed at upper ends of strut walls 11c, 11d constituting a strut 11, which project toward each other and function to prevent a disengagement of the cable end 16e from the brake lever 12. A clearance 23 is set up between the projections 11f and the free end 12e of the brake lever 12.

This clearance 23 functions the same as the member with the same reference number in FIGS. 1–8, and therefore the clearance 23 is designed to allow the functional engagement of the cable end 16e based on the following conditions in addition to being narrower than the cable end 16a from the lateral viewing in FIG. 14(a).

Accordingly, if the amount of rotation of the brake lever 12 is sufficient to fill clearances A1, A2 as shown in FIG. 14(a) existing between the brake shoes 13, 14 and the brake shoe engagement grooves 11a, 12b, the clearance 23 is still narrower than the thickness of the cable end 16e, thereby preventing disengagement of the cable end 16e. While further rotation of the brake lever 12 spreads the brake shoes 13, 14 open to fill the shoe clearance A3 as shown in FIG. 14(a), the clearance 23 becomes larger than the thickness of the cable end 16e.

Accordingly, in this example, the clearance 23 also functions the same and provides the same advantages as in FIGS. 1–8.

While the foregoing invention has been shown and described with reference to several preferred embodiments, it will be understood by those of skill in the art that various changes in form and detail may be made therein without departing from the spirit and scope of this invention.

What we claim is:

1. A brake cable connecting apparatus of a brake-actuating mechanism for a drum brake, the brake-actuating mechanism comprising:
   a strut engaging with one of a pair of brake shoes at one end thereof; and
   a brake lever, being pivotally attached to the other end of the strut, engaging with the other of the brake shoes at the other end thereof, said brake lever having a cable end engaging portion at the free end thereof, said cable end engaging portion being engaged with a cable end of a brake cable in a cable operating direction, wherein:
   a cable end stopper, preventing an inadvertent disengagement of the cable end from the brake lever in cooperation with the free end of the brake lever, is provided on the strut, and when the cable end is operated toward the cable end engaging portion in the cable operating direction in a clearance between the stopper and the free end of the brake lever so as to engage the cable end with the cable end engaging portion of the brake lever, the cable end can pass through said clearance because of a rotation of the brake lever against the returning force of the brake lever.

2. The brake cable connecting apparatus as claimed in claim 1, wherein the returning force of the brake lever is generated by a shoe return spring.

3. The brake cable connecting apparatus as claimed in claim 1, wherein the returning force of the brake lever is generated by a lever return spring.

* * * * *